United States Patent
Knight, Jr. et al.

(10) Patent No.: US 9,989,310 B2
(45) Date of Patent: Jun. 5, 2018

(54) DRYER EXHAUST HEAT RECOVERY

(71) Applicant: Bioleap, Inc., Tampa, FL (US)

(72) Inventors: James Knight, Jr., Tampa, FL (US); Olan Wayne Mitchell, Cape Coral, FL (US)

(73) Assignee: BIOLEAP INC., Tampa, FL (US)

( * ) Notice: Subject to any disclaimer, the term of this patent is extended or adjusted under 35 U.S.C. 154(b) by 0 days. days.

(21) Appl. No.: 15/496,413

(22) Filed: Apr. 25, 2017

(65) Prior Publication Data

US 2017/0227287 A1    Aug. 10, 2017

Related U.S. Application Data

(60) Provisional application No. 62/362,785, filed on Jul. 15, 2016.

(51) Int. Cl.
| F26B 23/00 | (2006.01) |
| F26B 25/00 | (2006.01) |
| B01D 53/26 | (2006.01) |
| B01D 47/00 | (2006.01) |

(52) U.S. Cl.
CPC ............ *F26B 23/004* (2013.01); *B01D 47/00* (2013.01); *B01D 53/265* (2013.01); *F26B 25/007* (2013.01); *F26B 2200/02* (2013.01)

(58) Field of Classification Search
CPC .. F26B 23/004; F26B 25/007; F26B 2200/02; B01D 47/00; B01D 53/265
See application file for complete search history.

(56) References Cited

U.S. PATENT DOCUMENTS

| 3,131,035 A | 4/1964 | Erickson |
| 4,660,511 A | 4/1987 | Anderson |
| 8,429,832 B2 | 4/2013 | Gissing et al. |
| 2011/0108409 A1 | 5/2011 | Brown |

FOREIGN PATENT DOCUMENTS

| CN | 1945181 A | 4/2007 |
| WO | 2013144438 A1 | 10/2013 |

*Primary Examiner* — Jessica Yuen
(74) *Attorney, Agent, or Firm* — David G. Maire; Beusse Wolter Sanks & Maire, PLLC

(57) ABSTRACT

Waste heat is extracted from the exhaust (20) of a biomass dryer (14) in a grain alcohol plant (10). A boiler circuit (74) provides high pressure steam to a balance of the plant (64). A recovered energy circuit (76) extracts heat from the exhaust via a dryer exhaust condensing economizer (24) and provides a steam mixture (60) to satisfy an intermediate pressure steam demand of the balance of the plant, thereby bypassing a portion of the boiler circuit. Working fluids in the boiler and recovered energy circuits are intermixed in a boiler feed vessel (72). Dryer exhaust condensate (30) may be used in an exhaust gas scrubber (22) upstream of the dryer exhaust condensing economizer to remove pollutants and to saturate (26) the exhaust gas for improved heat transfer. Heat transfer may be further improved by operating the dryer exhaust condensing economizer at an elevated pressure.

22 Claims, 1 Drawing Sheet

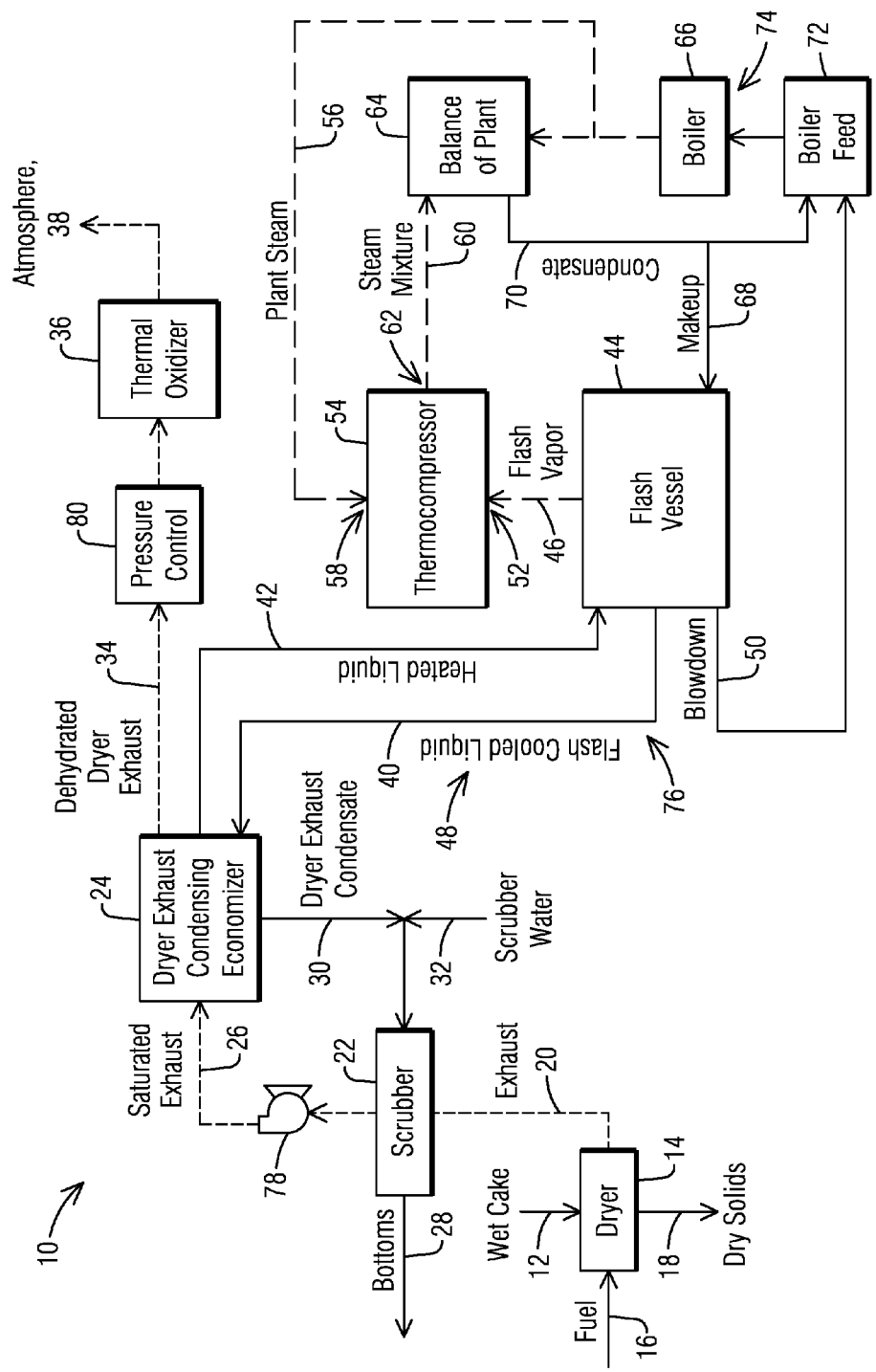

DRYER EXHAUST HEAT RECOVERY

This application claims benefit of the 15 Jul. 2016 filing date of U.S. provisional patent application No. 62/362,785.

FIELD OF THE INVENTION

This invention relates generally to recovering heat from waste gases produced during industrial processing of materials, and more specifically in one embodiment to recovering heat from the exhaust of a dryer used to remove moisture from a wet biomass produced during the production of alcohol.

BACKGROUND OF THE INVENTION

The efficient utilization of energy is important in any industrial process, and it is well known to recover heat from a process gas prior to exhausting the gas back into the environment. The production of an alcohol from corn or other biomass produces a moist solids byproduct (wet cake) which can be partially dried in a rotary drum or steam tube dryer before being further processed as animal feed or fertilizer. The dryer exhaust gas contains heat and moisture that can be captured before being released to the atmosphere.

U.S. Pat. No. 3,131,035 describes the recycling of dryer exhaust gas through an incinerator, with a portion of the incinerated gas being exhausted to atmosphere only after passing through a heat exchanger to pre-heat the bulk dryer exhaust gas travelling into the incinerator. That patent also teaches the extraction of heat from the exhaust gas via a heat exchanger using a liquid extracted from the material being dried. The heated liquid is then concentrated in an evaporator which produces both a concentrated liquid for reuse in the feedstock stream and a vapor that is condensed and disposed of in any suitable manner.

United States Patent Application Publication No. US 2011/0108409 A1 describes an ethanol production system where the exhaust stream from a steam dryer is directed to the bottom of a distillation column in order to heat the distillation column and to scrub the exhaust stream.

U.S. Pat. No. 8,429,832 describes the use of waste heat from a steam dryer being captured and used in the production of steam for the dryer.

International Application Publication No. WO 2013/144438 A1 describes the use of flue gas from a combustion device being used to heat a liquid to be concentrated in a multiple-effect evaporation plant.

Further improvements in the energy efficiency of such industrial processes are desired.

BRIEF DESCRIPTION OF THE DRAWINGS

The invention is explained in the following description in view of the sole FIGURE which is a schematic illustration of a grain alcohol plant embodiment of the invention.

DETAILED DESCRIPTION OF THE INVENTION

The present inventors have recognized that the benefit of capturing waste heat from exhaust gas involves not only the way that heat is transferred from the exhaust gas into another fluid, but also the way that the heated fluid is subsequently used to extract the recovered heat energy. The inventors have also recognized that prior art energy recovery systems which utilize fluids that are produced from or that are in contact with a biomass have limited flexibility due to the chemicals included in such fluids. Moreover, simple recycling of a fluid to reuse heat energy is generally efficient, but it limits the use of the recycled energy to the heating of the fluid being recycled.

In contrast, the present invention provides both an efficient mechanism for capturing waste heat from a biomass dryer exhaust gas and a highly flexible mechanism for reusing the captured energy. This is accomplished in one embodiment by utilizing a working fluid for the capture of the waste heat, wherein the working fluid is compatible with a fluid used in a balance of plant process. In a grain alcohol plant embodiment of the invention, one such working fluid is boiler feedwater quality water, which, after being heated by dryer exhaust gas, can be integrated into a boiler loop of a plant ethanol distillation process. Water is an ideal fluid for heat transfer due to its heat capacity and its low cost. The chemistry of boiler feedwater is typically closely controlled in order to minimize corrosion and to maximize heat transfer in the boiler loop. For a particular plant, boiler feedwater chemistry requirements are typically maintained in accordance with a specification specific for that plant, and the term "boiler feedwater quality" as used herein refers to the chemical composition required by specification for a particular plant's boiler loop.

The present inventors have also recognized an inherent inefficiency in the boiler/steam systems of existing grain alcohol plants. The inefficiency arises because those plants utilize steam at a number of different temperature/pressure conditions for a number of different purposes, including steam at a relatively high pressure for use in molecular sieves, steam at intermediate pressures for use in feedstock heaters and thin silage evaporators, and steam at relatively low pressure for use in the distillation columns. Because all of the plant steam is provided by a single boiler operating at the highest required pressure, steam for lower pressure uses is typically provided via an energy wasting pressure reduction device.

In contrast, an embodiment of the present invention minimizes such steam pressure reduction losses by extracting heat energy from the dryer exhaust gas stream using boiler feedwater quality water, and converting that recovered energy into steam at an intermediate pressure for use in the plant and subsequent return to the plant boiler circuit without the need for a pressure reduction device. As will be described more fully below, this approach effectively bypasses the boiler circuit for some of the plant steam uses.

Reference is now made to the FIGURE which is a block diagram of an embodiment of the invention as applied in a grain alcohol plant such as corn ethanol plant 10. A wet cake 12, such as corn or other biomass containing solids and water, is fed into an industrial dryer 14, such as a known rotary dryer or steam tube dryer. In the case of direct fire dryers, a fuel 16 such as natural gas is used as the energy source for drying the wet cake 12 to produce relatively drier solids 18. Dryer exhaust 20 evolved from the drying process may be directed through a saturation chamber or scrubber such as water scrubber 22 for two beneficial reasons. First, much of the particulate matter is removed from the dryer exhaust 20 which greatly reduces fouling and buildup of particulate matter on the heat transfer area of the downstream dryer exhaust condensing economizer 24. Second, by bringing dryer exhaust 20 into direct contact with a water source, the temperature of the dryer exhaust 20 drops and a proportional amount of water is evaporated. A dry scrubber may be used and will remove particulate matter, however, a wet scrubber, when optimized, will result in a fully saturated dryer exhaust 26, thereby optimizing heat transfer in the downstream economizer 24. The scrubber 22 may be of any known design, such as a spray tower, cyclone spray chamber, venturi scrubber, orifice scrubber, impingement scrubber, packed bed scrubber, etc. The saturated dryer exhaust 26 exits the water scrubber 22 and is directed into the dryer exhaust condensing economizer 24 where it functions as a heating agent for a working liquid to be described more fully below. Water scrubber bottoms 28, water plus particulate matter, is withdrawn from the water scrubber 22 at a rate as dictated by typical water scrubber design parameters. As the saturated dryer exhaust 26 passes through the dryer exhaust condensing economizer 24, a portion of the water vapor within the saturated dryer exhaust 26 will condense, producing dryer exhaust condensate 30. The dryer exhaust condensate 30 and/or supplemental scrubber water 32 may be provided as a water source for the scrubber 22. The somewhat dehydrated dryer exhaust 34 exits the dryer exhaust condensing economizer 24 and typically proceeds to a thermal oxidizer 36 before being passed to atmosphere 38. Much of the physical separation of the dehydrated dryer exhaust 34 and the dryer exhaust condensate 30 may occur within the dryer exhaust condensing economizer 24. To further aid in the separation of dryer exhaust condensate 30 from the somewhat dehydrated dryer exhaust 34, the somewhat dehydrated dryer exhaust 34 may be routed through a disengagement step (not shown), such as a through a disengagement vessel having a mist eliminator, before being delivered to the thermal oxidizer 36. Additional known heat removal equipment/processes (not illustrated) may be used to capture additional heat energy from the exhaust of the thermal oxidizer 36 prior to release of the gas to the atmosphere 38.

The working liquid used in the dryer exhaust condensing economizer 24 is a flash cooled liquid 40, which may be directed into the dryer exhaust condensing economizer 24 for indirect thermal communication with the saturated exhaust 26 in a counter flow direction or in a cross current direction as close to counter current as possible. The flash cooled liquid 40 picks up heat energy from the saturated dryer exhaust 26 and is withdrawn from the dryer exhaust condensing economizer 24 as heated liquid 42. The heated liquid 42 is then directed to a flash vessel 44 where the heated liquid 42 undergoes flash cooling, producing the flash cooled liquid 40 and flash vapor 46. The flash cooled liquid 40 being recirculated between the flash vessel 44 and the dryer exhaust condensing economizer 24 forms a working fluid loop 48. A portion of the circulating working liquid, preferably the flash cooled liquid 40, is withdrawn as blowdown 50 in order to control the buildup of solids in the system.

The flash vapor 46 is directed into the suction side 52 of a thermocompressor 54. Plant steam 56 is directed into the motive side 58 of the thermocompressor 54 in order to educe the flash vapor 46 into the suction side 52 of the thermocompressor 54. The resulting steam mixture 60 exits out of the discharge side 62 of the thermocompressor 54 at an intermediate pressure above that of the flash vapor 46 but below that of the plant steam 56. The steam mixture 60 can subsequently be used where there is demand in the balance of the plant 64 for steam at the corresponding saturation temperature of the steam mixture 60. The term "thermocompressor" as used herein is generally meant to include other similarly functioning devices such as injectors, ejectors, jet pumps, exhauster, etc. which merge lower and higher pressure fluids to produce an intermediate pressure fluid, such as by utilizing the venturi effect.

The plant steam 56 is provided by a boiler 66 which also provides plant steam 56 for other high pressure steam demands in the balance of plant 64, such as a molecular sieve (not shown). In this manner relatively low quality flash vapor 46 is converted to a higher intermediate quality mixture 60 in a very efficient manner, eliminating the need for reducing the pressure of available plant steam 56 with a less efficient pressure reducing valve in order to satisfy an intermediate pressure steam demand in the plant 10. Spent steam is condensed and provided as condensate 70 to a boiler feed vessel 72. Makeup liquid 68 is added to the flash vessel 44 in order to make up for the loss of mass from the fluid loop 48 as flash vapor 46 and blowdown 50. Makeup liquid 68 may be introduced directly into the flash vessel 44, as illustrated, or at another location in the fluid loop 48. Makeup liquid 68 may be sourced from condensate 70 from the balance of plant 64, as illustrated, or from other convenient sources such as from the boiler feed vessel 72 or from a boiler makeup water source (not illustrated). In some embodiments, blowdown 50 from the flash vessel 44 may be circulated directly or indirectly back to the boiler feed vessel 72.

It may be appreciated from the FIGURE that a boiler circuit 74 of the plant 10 includes the boiler feed vessel 72, boiler 66, and portions of the balance of plant 64 including a condenser (not illustrated). A recovered energy circuit 76 exists in parallel to the boiler circuit 74 and serves to provide steam for intermediate or low pressure uses in the balance of plant 64. The recovered energy circuit 76 includes the working fluid loop 48 moving heat from the dryer exhaust condensing economizer 24 into the flash vessel 44, as well as the thermocompressor 54, portions of the balance of plant 64 and boiler feed vessel 72. Both circuits 74, 76 operate with intermixed and essentially identical fluids, which in this embodiment of the invention is boiler feedwater quality water.

Embodiments of this invention may utilize water such as steam condensate, typically associated with a plant's steam system, as the working fluid (the flash cooled liquid 40, heated liquid 42, and makeup liquid 68). One of the benefits of utilizing steam condensate, or similar water solutions, is the nearly identical composition of the flash vapor 46 to that of typical boiler derived plant steam. Utilizing a compatible liquid, such as plant steam condensate, yields identical or nearly identical condensate from the steam mixture 60 as compared to typical boiler derived plant steam condensate. This allows the present invention to be installed within the constructs of typical steam systems without the use of non-boiler compatible liquids. Other embodiments may be envisioned where the working fluid is a non-water fluid that is compatible with a non-water balance of plant system fluid, for example a closed Rankine cycle using an alternative fluid such as ethanol or methanol.

The present invention allows the recovered dryer exhaust heat energy to be fully utilized in an efficient manner. Moreover, condensation of water from within the dryer exhaust gas facilitates the removal of some water soluble pollutants that would otherwise either have to be destroyed, typically in the thermal oxidizer 36, or emitted as pollution to the atmosphere 38. The optional inclusion of the saturation step, i.e. water scrubber 22, is capable of removing even more potential pollutants than the condensation alone. Energy consumed in the thermal oxidizer 36 can be estimated as the net increase in temperature between the feed gases and the exit gases, multiplied by the specific heat of those gases, multiplied by the mass flow rate of those gases. The condensation of water from within the dryer exhaust by the present invention reduces the total mass flow of the dryer exhaust that enters the thermal oxidizer 36, which subsequently reduces the amount of energy used and wasted during the downstream oxidization step.

Heat transfer efficiency in the dryer exhaust condensing economizer 24 may be improved by increasing the pressure of the saturated exhaust 26 to a value above the normal ambient pressure used to induce the flow of the gas through the system. This may be accomplished by including a pressure increasing device such as a blower 78 in the exhaust flow path anywhere upstream of the dryer exhaust condensing economizer 24 (e.g. upstream of the dryer 14, between dryer 14 and scrubber 22, or between scrubber 22 and economizer 24) and a pressure control device 80 in the exhaust flow path anywhere downstream of the dryer exhaust condensing economizer 24 and before venting to atmosphere 38. When upgrading an existing plant to include this optional feature, excess capacity of an existing blower of the dryer system may be utilized, subject to pressure limitations in the remainder of the system components. A pressure increase of only one inch of mercury may yield a twenty five percent improvement in the log mean temperature difference in the dryer exhaust condensing economizer 24.

In another embodiment, a plant including a dryer operable to remove moisture from a wet cake and to produce dryer exhaust gas comprising water vapor may include an improvement including: a dryer exhaust condensing economizer having an exhaust gas inlet for receiving the dryer exhaust gas and an exhaust gas outlet for discharging dehydrated dryer exhaust gas, and further having a cooling fluid inlet and a cooling fluid outlet of the dryer exhaust condensing economizer in fluid communication with a boiler circuit of the plant; and a saturation chamber disposed between the dryer and the dryer exhaust condensing economizer for saturating the dryer exhaust gas with water vapor upstream of the dryer exhaust condensing economizer exhaust gas inlet. The improvement may further include a conduit for delivering dryer exhaust condensate from the dryer exhaust condensing economizer to the saturation chamber. The improvement may include a pressure increasing device disposed in a flow path of the dryer exhaust gas upstream of the dryer exhaust condensing economizer and a pressure control device disposed in the flow path of the dryer exhaust gas downstream of the dryer exhaust condensing economizer, the pressure increasing device and pressure control device cooperatively operable to control a pressure of the dryer exhaust gas in the dryer exhaust condensing economizer. The improvement may include: a flash vessel comprising a working fluid inlet, a working fluid outlet and a flash vapor outlet; a working fluid loop interconnecting the dryer exhaust condensing economizer cooling fluid outlet with the flash vessel working fluid inlet, and interconnecting the flash vessel working fluid outlet with the dryer exhaust condensing economizer cooling fluid inlet; and a thermocompressor having a suction side for receiving a flash vapor from the flash vapor outlet of the flash vessel and a motive side for receiving plant process vapor, the thermocompressor operable to produce a vapor mixture. Such a plant may be a corn ethanol plant and the plant process vapor and the vapor mixture may be steam.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for a plant, the plant including a dryer operable to remove moisture from a wet cake and to produce dryer exhaust gas comprising water vapor, the plant also including an apparatus operable to produce a plant process vapor, the system comprising:
   a dryer exhaust condensing economizer comprising an exhaust gas inlet for receiving the dryer exhaust gas and an exhaust gas outlet for discharging dehydrated dryer exhaust gas, and further comprising a working liquid inlet and a working liquid outlet;
   a flash vessel comprising a working liquid inlet, a working liquid outlet and a flash vapor outlet;
   a working liquid loop interconnecting the dryer exhaust condensing economizer working liquid outlet with the flash vessel working liquid inlet, and interconnecting the flash vessel working liquid outlet with the dryer exhaust condensing economizer working liquid inlet; and
   a thermocompressor comprising a suction side for receiving a flash vapor from the flash vapor outlet of the flash vessel and a motive side for receiving the plant process vapor, the thermocompressor operable to produce a vapor mixture;
   wherein during operation of the plant, the improvement is effective to move heat from the dryer exhaust gas into the vapor mixture via the working liquid loop for use in the plant.

2. The system of claim 1, further comprising a wet scrubber disposed between the dryer and the dryer exhaust condensing economizer for saturating the dryer exhaust gas with water vapor upstream of the dryer exhaust condensing economizer exhaust gas inlet.

3. The system of claim 2, further comprising a conduit for delivering dryer exhaust condensate from the dryer exhaust condensing economizer to the wet scrubber.

4. The system of claim 1, further comprising a pressure increasing device disposed in a flow path of the dryer exhaust gas upstream of the dryer exhaust condensing economizer, and a pressure control device disposed in the flow path of the dryer exhaust gas downstream of the dryer exhaust condensing economizer, the pressure increasing device and pressure control device cooperatively operable to control a pressure of the dryer exhaust gas in the dryer exhaust condensing economizer.

5. A corn ethanol plant comprising the system of claim 1.

6. A plant comprising the system of claim 1, wherein the plant process vapor and the vapor mixture comprise steam.

7. A system for use in a grain alcohol plant, the grain alcohol plant including a dryer operable to remove moisture from a wet cake and to produce dryer exhaust gas comprising water vapor, the grain alcohol plant also including a boiler operable to produce plant steam, the system comprising:
   a dryer exhaust condensing economizer operable to use liquid water as a cooling fluid to condense water vapor from the dryer exhaust gas;
   a flash vessel in water loop communication with the dryer exhaust condensing economizer and operable to produce flash water vapor when receiving heated water from the dryer exhaust condensing economizer and returning flash cooled water to the dryer exhaust condensing economizer;
   a thermocompressor operable to produce an intermediate pressure steam mixture when receiving the flash water vapor at a relatively lower pressure and the plant steam at a relatively higher pressure, the intermediate pressure steam usable in the grain alcohol plant; and a boiler loop of the grain alcohol plant in fluid communication with the flash vessel.

8. The system of claim 7, further comprising a scrubber disposed between the dryer and the dryer exhaust condensing economizer.

9. The system of claim 8, wherein the scrubber comprises a wet scrubber, and further comprising a conduit for delivering dryer exhaust condensate from the dryer exhaust condensing economizer to the wet scrubber.

10. The system of claim 7, further comprising a pressure increasing device disposed in a flow path of the dryer exhaust gas upstream of the dryer exhaust condensing economizer and a pressure control device disposed in the flow path of the dryer exhaust gas downstream of the dryer exhaust condensing economizer, the pressure increasing device and pressure control device cooperatively operable to control a pressure of the dryer exhaust gas in the dryer exhaust condensing economizer.

11. A corn ethanol plant comprising the system of claim 7.

12. A method of recovering heat from dryer exhaust gas comprising water vapor in a plant, the plant comprising a dryer operable to remove moisture from a wet cake and to produce the dryer exhaust gas comprising water vapor, the plant also comprising an apparatus operable to produce a plant process vapor, the method comprising:
    directing the dryer exhaust gas and cooled working liquid into a dryer exhaust condensing economizer;
    discharging dehydrated dryer exhaust gas and heated working liquid from the dryer exhaust condensing economizer;
    directing the heated working liquid into a flash vessel to produce the cooled working liquid and a flash vapor;
    directing the flash vapor to a suction side of a thermocompressor and directing the plant process vapor to a motive side of the thermocompressor to produce a vapor mixture;
    wherein the method is effective to move heat from the dryer exhaust gas into the vapor mixture via the working liquid for use in the plant.

13. The method of claim 12, further comprising saturating the dryer exhaust gas with water vapor in a wet scrubber upstream of the dryer exhaust condensing economizer.

14. The method of claim 13, further comprising delivering dryer exhaust condensate from the dryer exhaust condensing economizer to the wet scrubber.

15. The method of claim 12, further comprising controlling a pressure of the dryer exhaust gas in the dryer exhaust condensing economizer with a pressure increasing device disposed in a flow path of the dryer exhaust gas upstream of the dryer exhaust condensing economizer and a pressure control device disposed in the flow path of the dryer exhaust gas downstream of the dryer exhaust condensing economizer.

16. A method of recovering heat from a dryer exhaust gas of a corn ethanol plant, the method comprising practicing the method of claim 12 in the corn ethanol plant.

17. A method of recovering heat from a dryer exhaust gas of a plant, the method comprising practicing the method of claim 12 in the plant wherein the plant process vapor and the vapor mixture comprise steam.

18. A method of recovering heat from a dryer exhaust gas comprising water vapor in a grain alcohol plant, the plant comprising a dryer operable to remove moisture from a wet cake and to produce the dryer exhaust gas comprising water vapor, the plant also comprising a boiler loop operable to produce plant steam, the method comprising:
    condensing water vapor from the dryer exhaust gas in a dryer exhaust condensing economizer using flash cooled liquid water as a cooling fluid and producing dehydrated dryer exhaust gas and heated liquid water;
    directing the heated liquid water to a flash vessel in water loop communication with the dryer exhaust condensing economizer to produce flash water vapor and the flash cooled water;
    directing the flash water vapor at a relatively lower pressure and the plant steam at a relatively higher pressure to a thermocompressor to produce an intermediate pressure steam mixture, the intermediate pressure steam mixture usable in the grain alcohol plant; and
    placing the boiler loop of the grain alcohol plant in fluid communication with the flash vessel.

19. The method of claim 18, further comprising disposing a scrubber between the dryer and the dryer exhaust condensing economizer.

20. The method of claim 19, wherein the scrubber comprises a wet scrubber, and further comprising delivering dryer exhaust condensate from the dryer exhaust condensing economizer to the wet scrubber.

21. The method of claim 18, further comprising disposing a pressure increasing device in a flow path of the dryer exhaust gas upstream of the dryer exhaust condensing economizer and a pressure control device in the flow path of the dryer exhaust gas downstream of the dryer exhaust condensing economizer, and operating the pressure increasing device and pressure control device to control a pressure of the dryer exhaust gas in the dryer exhaust condensing economizer.

22. A method of recovering heat from a dryer exhaust gas in a corn ethanol plant, the method comprising practicing the method of claim 18 in the corn ethanol plant.

* * * * *

UNITED STATES PATENT AND TRADEMARK OFFICE
CERTIFICATE OF CORRECTION

| | | |
|---|---|---|
| PATENT NO. | : 9,989,310 B2 | Page 1 of 1 |
| APPLICATION NO. | : 15/496413 | |
| DATED | : June 5, 2018 | |
| INVENTOR(S) | : James Knight, Jr. and Olan Wayne Mitchell | |

It is certified that error appears in the above-identified patent and that said Letters Patent is hereby corrected as shown below:

In the Claims

Claim 1, Column 6, Line 27, replace "improvement" with --system--.

Signed and Sealed this
Thirtieth Day of October, 2018

Andrei Iancu
*Director of the United States Patent and Trademark Office*